United States Patent [19]

Uhl

[11] Patent Number: 4,465,174

[45] Date of Patent: Aug. 14, 1984

[54] APPARATUS AND METHOD FOR TRANSFERRING ARTICLES TO AND FROM CARRIERS MOVING IN A VERTICAL PATH

[75] Inventor: Robert J. Uhl, Wayne, N.J.

[73] Assignee: American Standard Inc., New York, N.Y.

[21] Appl. No.: 427,445

[22] Filed: Sep. 29, 1982

[51] Int. Cl.³ .............................................. B65G 13/00
[52] U.S. Cl. .................................... 198/361; 198/369
[58] Field of Search ............... 198/360, 361, 369, 483, 198/484, 796, 681, 473

[56] References Cited

U.S. PATENT DOCUMENTS

| | | | |
|---|---|---|---|
| 1,086,886 | 2/1914 | Bernheim | 198/369 |
| 1,219,898 | 3/1917 | Alvey | 198/360 |
| 1,302,631 | 5/1919 | Buck | 198/484 |
| 3,004,651 | 10/1961 | Manspeaker et al. | 198/607 |
| 3,340,821 | 9/1967 | Wesener | 104/88 |
| 3,502,038 | 3/1970 | Wesener | 104/88 |
| 3,595,376 | 7/1971 | Tonelli | 198/627 |
| 3,636,883 | 1/1972 | Wesener | 104/50 |
| 3,902,427 | 9/1975 | Kastenbein | 198/648 |
| 3,918,367 | 11/1975 | Alimanestianu et al. | 104/88 |

*Primary Examiner*—Joseph E. Valenza
*Assistant Examiner*—Stuart Millman
*Attorney, Agent, or Firm*—Wood, Herron & Evans

[57] ABSTRACT

A method and apparatus for transferring containers having projections horizontally extending from a pair of opposite sides thereof between a vertically moving tray and a pair of generally horizontally disposed transfer tracks which can be moved between (a) an inner position in vertical alignment with the container projections for transferring a container to or from an upwardly or downwardly moving tray, respectively, and (b) an outer position in which the transfer tracks are displaced outwardly and laterally of the container projections, to allow a container on an upwardly or downwardly moving tray to pass unimpeded past the transfer tracks when transfer thereof from the tray is not desired.

24 Claims, 3 Drawing Figures

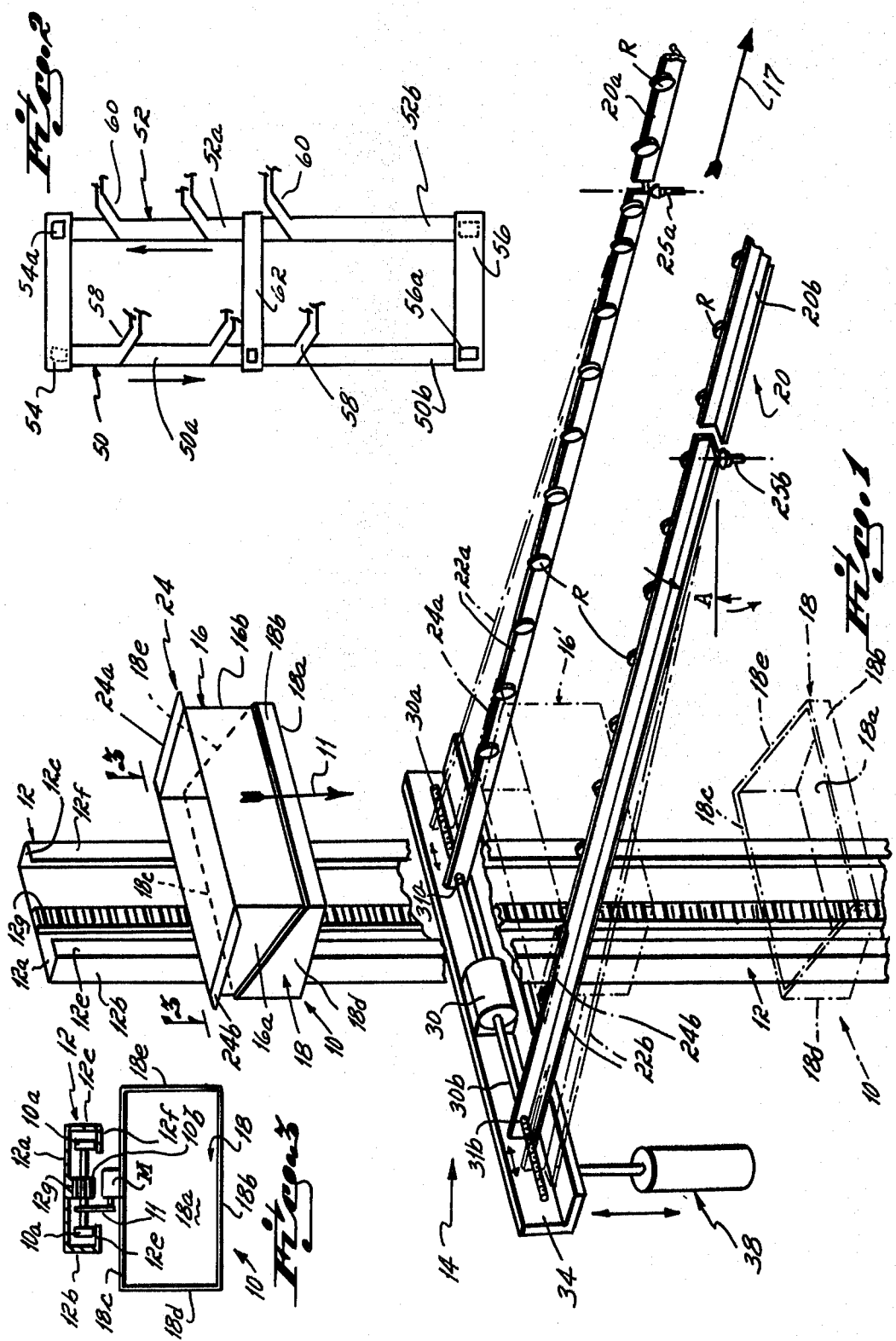

APPARATUS AND METHOD FOR TRANSFERRING ARTICLES TO AND FROM CARRIERS MOVING IN A VERTICAL PATH

This invention relates to article transfer systems, and more particularly to article transfer systems which facilitate transfer of a container to and from a tray which is driven upwardly and/or downwardly on a vertical track by a carrier to which the tray is secured.

Article transport systems of a variety of types exist for transporting articles in vertical paths. Perhaps the most common type is the chain conveyor having article-supporting hooks or shelves, or the like. Another, and less common type, uses a motorized carrier which travels in a vertical track in which it is captive. With many of these systems the articles cannot be conveniently transferred to and from the vertically moving transport without utilization of relatively complicated article transfer apparatus and methods.

Accordingly, it has been an objective of this invention to provide an article transport system of the vertical type which facilitates relatively simple and convenient transfer of articles to and from the vertical transport. This objective has been accomplished in accordance with certain of the principles of this invention by providing, in combination with a mobile article transport or carrier which moves in a vertical direction, (a) a pair of projections extending generally horizontally from opposite sides of an article which is supported by the carrier for vertical movement and (b) a pair of generally horizontally disposed article transfer members located along the path of the carrier which are alternatively movable between (i) an inner transfer orientation in vertical alignment with the projections of an article supported on the carrier to effect transfer of an article to or from the carrier depending upon whether the carrier is moving upwardly or downwardly, and (ii) an outer bypass orientation in which the article transfer members and the projections are vertically misaligned to preclude transfer of an article between the carrier and the transfer members.

In a preferred embodiment of the invention, the carrier includes a generally horizontally disposed platform secured thereto and extending therefrom for supporting an article as the carrier moves upwardly and/or downwardly in a vertical path. In the preferred embodiment, the transfer members are each elongated tracks which, when in their inner transfer orientation, are substantially parallel for underlying and slidingly engaging the projections of an article to facilitate transport thereof in a horizontal direction toward or away from the vertical path of the carrier such that upwardly moving carriers having empty supports passing between the tracks will pick up an awaiting article supported with its projections engaging the transfer tracks, while an article supported on a downwardly moving carrier-mounted platform will be transferred to the tracks as the carrier moves downwardly therebetween and the article projections are intercepted by the underlying tracks.

In accordance with a refinement of the preferred embodiment, the elongated transfer tracks are mounted for pivotal movement about their outer ends which are remote from the path of the vertically moving carrier. As the transfer tracks pivot, the ends thereof located proximate the vertical path of the carrier move in an arcuate path between their (a) inner, transfer position in vertical alignment with the projections of an article to facilitate transfer of articles between the tracks and moving carrier, and (b) their outer bypass position in which the transfer tracks are not vertically aligned with the projections of a carriage-supported article to enable carriage-supported articles to move uninterrupted past the transfer tracks.

In accordance with a further aspect of the preferred embodiment of the invention, the transfer tracks are inclined either downwardly away from the path of travel of a downwardly moving carrier or downwardly toward the path of travel of an upwardly moving carrier. With the transfer tracks inclined downwardly away from a downwardly moving carrier, when the transfer tracks are in their inner transfer position an article transferred to the tracks from a downwardly moving carrier automatically slides under gravity force along the inclined transfer tracks away from the vertical path of the carrier. Similarly, with the transfer tracks inclined downwardly toward the path of travel of the carrier, an article supported on the transfer tracks slides under the force of gravity downwardly on the transfer tracks toward the vertical path of the carrier such that it will be picked up as the upwardly moving carrier passes between the transfer tracks.

These and other advantages, features, and objectives of the invention will become more readily apparent from a detailed description thereof taken in conjunction with the drawings in which:

FIG. 1 is a perspective view of a preferred form of article transfer apparatus for transferring a container to and/or from a carrier-supported tray movable in a vertical path past a transfer station;

FIG. 2 is a schematic view of an article transfer system having multiple article transfer stations incorporating the article transfer apparatus of this invention; and FIG. 3 is a cross-sectional view taken on line 3—3 of FIG. 1 illustrating a mobile carrier and associated tray relative to which a container can be selectively attached and/or detached at the transfer station utilizing the article transfer apparatus of this invention.

With reference to FIG. 1, the article transfer apparatus and method of this invention is seen to include a mobile article carrier 10 which is power-driven along a generally vertical path, for example, in a vertically downwardly direction. As will be apparent hereafter, the mobile carrier 10 may be powered in a generally vertically upwardly path and/or selectively powered in either a vertically upwardly or a vertically downwardly direction. Suitable guide means for the carrier 10, such as track 12, is provided for defining the path along which the mobile carrier 10 travels. By way of example, the track 12 may extend between the top floor and basement of a multi-story building, such as a hospital, office, or the like. In such a multi-story building application, an article transfer station 14 of the general type shown in FIG. 1 would be provided at each floor for transferring articles, for example, containers 16 supported by the carrier 10, from the vertical path 11 to a horizontal path 17.

In a manner to be described in more detail hereafter, the article or container 16 is detachably supported by the carrier 10 in an open-top article-supporting tray 18 which is fixedly mounted to the carrier 10. The tray 18 includes a bottom surface 18a which is generally planar and horizontally disposed. Extending upwardly from the front edge of the bottom surface 18a is a front wall 18b of the limited height. Extending vertically upwardly from the rear edge of the bottom surface 18a is a rear wall 18c. The tray 18 is also provided with opposite side walls 18d and 18e. The front, rear, opposite side, and bottom walls of the tray 18 are integral, forming a tray which is open at the top to removably support the article or container 16. The tray 18 can be secured in any suitable manner to the mobile article carrier 10, such as by having its rear wall 18c fastened to the carrier 10. As noted the article 16, in a preferred form, is a container of suitable configuration to be easily inserted and removed in the tray 18 by relative vertical motion with respect thereto. The container 16 is preferably provided with a lid or cover for selectively sealing its interior to prevent removal of the contents thereof.

The guide track 12 and the associated carrier 10 may taken any suitable form. For example, the guide track 12 and mobile carrier 10 may be of the type described in U.S. Pat. No. 3,304,821 in the name of Wesener. As is described in that patent, the guide track consists of a bottom surface 12a from which perpendicularly extend sides 12b and 12c having inwardly directed lips 12e and 12f, which collectively guide and contain front and rear pairs of wheels 10a of the captive motorized carrier. The guide track 12 is also provided with a longitudinally extending rack 12g which cooperates with a suitably power-driven pinion 10b mounted on the carrier for imparting driving motion to the carrier. The carrier 10 is provided with a suitable electrical motor M which imparts driving motion to the pinion 10b via a chain or belt 11 for driving the carrier along vertical sections of the guide track 12. The electrical power for the motor M of carrier 10 may be provided by batteries contained within the carrier. Alternatively, the carrier motor M may be powered from exposed electrical rails (not shown) which are secured to, and insulated from, the bottom 12a of the guide track. Suitable wipers (not shown) are provided on the bottom surface of the carrier 10 for slidingly contacting, or wiping, the exposed electric rails as the carrier travels along the track. Instead of a wheeled, motor-driven carrier captured within a guide track 12, the carrier 10 may take the form of an article support secured to a vertically disposed endless chain which guides over suitable disposed sprockets, at least one of which is driven to impart motion to the chain and, in turn, the carrier or article support.

To facilitate transfer of the container 16 from the tray 18 of a downwardly moving carrier 10 to a horizontally disposed container storage section 20, a pair of generally horizontal transfer tracks 22a and 22b are provided in combination with a pair of container projections 24. The container projections 24 take the form of horizontally disposed lips or flanges 24a and 24b which extend in opposite horizontal directions from the upper edges of opposite container side walls 16a and 16b. The transfer tracks 22a and 22b are elongated and provided with rollers R at periodic intervals along their respective lengths. At the outer end, the elongated transfer tracks 22a and 22b are mounted for pivotal movement in horizontal arcs about vertical axes on stationarily mounted pins 25a and 25b which pass through suitable openings in the transfer tracks. The transfer tracks pivot between an inner or transfer orientation shown in solid lines in FIG. 1, and an outer or bypass orientation shown in phantom lines in FIG. 1. In the inner or transfer position (solid lines) the transfer tracks 22a and 22b are in vertical alignment with the projection flanges 24a and 24b of a container 16 supported in a tray 18. In the outer or bypass position of the transfer tracks (phantom lines), the transfer tracks are disposed outboard of the container projection flanges 24a and 24b to provide clearance therebetween such that there is no mechanical interference between the container projection flanges 24a and 24b as a container 16 passes between the transfer tracks on a descending carrier-driven tray 18.

To selectively drive the pivotal transfer tracks 22a and 22b between their inner and outer positions, a dual shaft motor 30 which is selectively bidirectionally driven is provided. Axially extending from the oppositely directed motor shafts are oppositely threaded screws 30a and 30b which engage with suitably threaded nuts 31a and 31b anchored in the inner ends of the transfer tracks 22a and 22b. Depending upon the rotational direction of the motor 30, the threaded screws 30a and 30b rotate clockwise or counterclockwise to pivot the transfer tracks 22a and 22b inwardly or outwardly between the inner solid line position and the outer phantom line position. To support the movable ends of the transfer tracks 22a and 22b a horizontal guide rail 34 is provided on which the movable ends of the transfer tracks are free to slide.

In operation, if it is desired to transfer a container 16 supported in the tray 18 secured to the vertically downwardly moving carrier 10, the motor 30 is energized to pivot the transfer tracks 22a and 22b from their outer bypass orientation (phantom lines) to their inner transfer orientation (solid lines) in which the transfer tracks underlie and are in vertical alignment with the container projection flanges 24a and 24b. With the transfer tracks so located relative to the container projections 24, as the carrier-driven tray 18 moves downwardly between the transfer tracks 22a and 22b, the container projections 24 engage the transfer tracks 22a and 22b, arresting the downward motion of the container 16. Continued downward motion of the tray 18 by the carrier 10 causes the tray to disengage the container 16, transferring support of the container from the tray 18 to the transfer tracks 22a and 22b.

To permit movement of the tray 18 between the ends of the transfer tracks 22a and 22b located proximate the vertical track 12 when the transfer tracks are in their inner transfer position, the distance between the confronting portions of the transfer tracks must be slightly in excess of the distance between the tray walls 18d and 18e. This will provide the necessary clearance between the tray 18 and the transfer tracks when the latter are in their inner transfer position. Similarly, the projections 24a and 24b of the container 16 must be dimensioned such that when the article transfer tracks 22a and 22b are in their inner article transfer position the projections 24a and 24b are in vertical alignment with the transfer tracks, thereby enabling transfer of containers between the tracks 22 and the tray 18.

To facilitate automatic transport under gravity force to the storage tracks 20 of a container 16 supported by transfer tracks 22a and 22b subsequent to its disengagement from the downwardly moving carrier-mounted tray 18, the transfer tracks 22a and 22b are preferably inclined downwardly away from the track 12, such as at an angle A with respect to the horizontal. With the tracks so angled, the container 16, with its flanges 24a and 24b engaged with the transfer tracks 22a and 22b, slides on rollers R in the direction of arrow 17 along the transfer tracks toward the storage tracks 20. Once the container has been transferred to the storage tracks 20a and 20b, the transfer tracks 22a and 22b can be returned to their outer bypass position (phantom lines), if desired, by energization of the motor 30 in the appropriate direction. Alternatively, if plural carriers 10 are mounted on the track 12 and successive carriers have trays 18 supporting containers 16 and such successive containers are to be transferred to the storage tracks 20a and 20b at transfer station 14, the transfer tracks 22a and 22b may be left in their inner transfer position such that as the carriers successively pass downwardly between the transfer tracks, the containers respectively supported thereon will be successively removed from the trays thereof and successively transported down the transfer tracks to the storage section.

If desired, the transfer apparatus of this invention can be operative to transfer a container from the storage section 20 to the tray 18 of an upwardly moving carrier. Assuming a carrier, such as carrier 10 shown in FIG. 1, is moving upwardly and contains an empty tray 18, transfer of a container 16 supported on storage tracks 20a and 20b to the empty tray 18 of the upwardly moving carrier 10 is effected by pivoting the transfer tracks 22a and 22b from their outer bypass position to their inner transfer position prior to the time the upwardly moving carrier 10 having the empty tray reaches the transfer station 14. With the transfer tracks 22a and 22b their inner transfer position, and prior to the time the empty tray 18 secured to the upwardly moving carrier 10 reaches the transfer station, the tray which is supported on the delivery tracks 20a and 20b is slid along the transfer tracks 22a and 22b to the phantom line position bearing the reference numeral 16'. With the container 16 in position 16', when the empty tray 18 secured to the upwardly moving carrier 10 reaches the transfer station 14, the container will seat in the tray. As the carrier-driven tray 18 continues moving upwardly, support of the container 16' will be transferred from the transfer tracks 22a and 22b to the tray 18 and the container will be carried along in the tray to the destination to which the carrier 10 is driven.

To facilitate automatic transport of a container from the storage section 20 to the phantom line position 16' prior to pickup by an upwardly moving tray, means can be provided for angling the transfer tracks downwardly toward the guide track 12 such that the ends associated with the guide rail 34 are at a lower elevation than the pivotal ends associated with the pins 25a and 25b.

If the carrier 10 is bidirectionally selectively driven upwardly and downwardly on the track 12 to facilitate transfer of trays in both directions between the storage section 20 and carrier-driven trays 18 passing between the transfer tracks 20a and 20b, an elevating mechanism 38, such as a pneumatically driven piston/cylinder arrangement, can be provided for selectively raising and lowering the guide rail 34 and the ends of the transfer tracks 22a and 22b associated therewith between positions above and below the horizontal plane of the pivoted ends of the transfer tracks associated with pivots 25a and 25b.

If uni-directional travel of carriers on a track in a bidirectional system is desired, a two-track system of the type shown in FIG. 2 may be utilized. With reference to FIG. 2, a system is shown consisting of parallel tracks 50 and 52 having upper vertically disposed sections 50a and 52a and lower vertically disposed sections 50b and 52b which are interconnected. The upper and lower extremities of upper track sections 50a and 52a and lower track sections 50b and 52b are connected by carrier switches 54 and 56 which are operative to transfer carriers between the tracks 50 and 52, as desired.

One preferred form of carrier switch is the type described in the Wesener U.S. patent referenced hereinabove.

In accordance with the Wesener switch, selectively bidirectionally laterally driven switch track sections 54a and 56a are provided in the switches 54 and 56, respectively. To transfer a carrier from the upper track section 52a to the upper track section 50a, the laterally shiftable switch track section 54a is moved to the solid line position shown in FIG. 2 which is in alignment with the track section 52a. The carrier is then driven upwardly from the upper end of track section 52a onto the aligned switch track section 54a. With the carrier on the track section 54a, the switch track section 54a is shifted laterally leftwardly into alignment with the upper end of track section 50a as shown by phantom lines. The carrier is then driven downwardly onto the aligned track section 50a. Similarly, a carrier is transferred from the lower track section 50b to the lower track section 52b by aligning the laterally shiftable track section 56a of switch 56 with the end of track section 50b, driving the carrier from track section 50b onto switch track section 56a, transferring the switch track section 56a with the carrier thereon from a position in alignment with track section 50b (solid lines) to a position in alignment with track section 52b (phantom lines), and driving the carrier from the switch track section 56a onto the aligned track section 52b.

With switches 54 and 56 operating in the manner described at the upper and lower ends of the tracks 50 and 52, the tracks 50 and 52 can be operated with one-way traffic, with the carriers on track 50a moving vertically downwardly and the carriers on track 52a moving vertically upwardly. With an arrangement of this type, the transfer tracks associated with the track 50, which are shown schematically bearing the reference numeral 58, can be permanently inclined downwardly and away from the track 50a such that containers removed from carrier-driven trays moving downwardly on track 50 will be automatically transported away from the vertical track 50. Similarly, the transfer tracks 60 associated with track 52 on which carriers move only in an upwardly direction can be permanently inclined downwardly toward the track 52 such that containers to be transferred to upwardly moving carriers on track 52 will be automatically transported toward the track 52.

If desired, switches similar to switches 54 and 56 may be provided at intermediate points to transfer carriers between the tracks 50 and 52, such as the switch 62 which is intermediate the upper and lower ends of the tracks 50 and 52.

Track sections, if desired, may be extended below the switch 56 vertically, as well as into a horizontal plane to store carriers containing empty trays until such time as needed for receiving containers at transfer stations 60.

The entire disclosure of Wesener U.S. Pat. No. 3,304,821 is incorporated herein by reference to illustrate one form of carrier, track, and switch assembly suitable in practicing the container transfer apparatus and method of this invention.

What is claimed is:

1. Apparatus for transferring an article at a transfer station, comprising:
    a mobile article carrier,
    means for selectively alternatively moving said carrier upwardly and downwardly in a defined generally vertical path proximate a transfer station, an article support moving with said carrier for supporting an article engaged therewith, said article support being configured to engage and disengage an unsupported and supported article, respectively, when said article support moves vertically upwardly and vertically downwardly, respectively, relative to said unsupported and supported article, respectively, a pair of projections extending generally horizontally from opposite sides of said article, a pair of generally horizontally disposed article transfer members located at said transfer station proximate said vertical path and selectively movable toward and away from each other between an inner transfer orientation in vertical alignment with said pair of projections and an outer bypass orientation disposed outwardly of said projections in vertical misalignment therewith, and means for alternatively moving said article transfer members between said inner transfer orientation and said outer bypass orientation, said article transfer means when in said inner transfer orientation alternatively (a) underlying said projections to transfer an article engaged on a vertically downwardly moving support to said transfer members, or (b) transferring an article whose projections are supportingly engaged by said transfer members to an underlying vertically upwardly moving article support, said article transfer means when in said outer bypass orientation providing clearance between said article transfer members and the projections of an article to preclude transfer of an article between said article support and said transfer members.

2. The apparatus of claim 1 wherein said article support includes a generally horizontally disposed platform secured to and extending from said article carrier moving means, and said article includes a generally horizontal bottom surface adapted to selectively seat on said platform for facilitating support of said article by said article support when engaged thereby.

3. The apparatus of claim 1 wherein said transfer members are each elongated tracks which, when in said inner orientation, are substantially parallel for underlying and slidingly engaging the projections of an article to facilitate transport thereof in a generally horizontal direction toward or away from said vertical path.

4. The apparatus of claim 3 wherein said tracks are each pivoted at the respective ends thereof remote from said vertical path about a vertical axis to facilitate the respective other ends of said tracks located proximate said transfer station to move through arcuate horizontal paths between said inner and outer orientations.

5. The apparatus of claim 4 wherein said means for moving said transfer members includes horizontal screw means disposed transversely of, and threadedly engaged with, said tracks to pivot said tracks between said inner and outer orientations when said screw means is selectively bidirectionally driven.

6. The apparatus of claim 3 wherein said tracks are each inclined downwardly away from said transfer station to transport away from said vertical path under gravity force an article transferred to said tracks from a downwardly moving article support.

7. The apparatus of claim 3 wherein said tracks are each inclined downwardly toward said transfer station to transport toward said vertical path under gravity force an article on said tracks for subsequent transfer to an upwardly moving article support.

8. Apparatus for transferring an article at a transfer station, comprising:

a mobile article carrier, means for moving said carrier downwardly in a defined generally vertical path proximate a transfer station, an article support moving with said carrier for supporting an article engaged therewith, said article support being configured to disengage an article supported thereby when said article support moves vertically downwardly relative to said supported article, a pair of projections extending generally horizontally from opposite sides of said article, a pair of generally horizontally disposed article transfer members located at said transfer station proximate said vertical path and selectively movable toward and away from each other between an inner transfer orientation in vertical alignment with said pair of projections and an outer bypass orientation disposed outwardly of said projections in vertical misalignment therewith, and means for alternatively moving said article transfer members between said inner transfer orientation and said outer bypass orientation, said article transfer means when in said inner transfer orientation underlying said projections to transfer an article engaged on a vertically downwardly moving support to said transfer members, said article transfer means when in said outer bypass orientation providing clearance between said article transfer members and the projections of an article supported on a vertically downwardly moving article support to preclude transfer of said article from said downwardly moving article support to said transfer members.

9. The apparatus of claim 8 wherein said article support includes a generally horizontally disposed platform secured to and extending from said article carrier moving means, and said article includes a generally horizontal bottom surface adapted to selectively seat on said platform for facilitating support of said article by said article support when engaged thereby.

10. The apparatus of claim 8 wherein said transfer members are each elongated tracks which, when in said inner orientation, are substantially parallel for underlying and slidingly engaging the projections of an article to facilitate transport thereof in a generally horizontal direction relative to said vertical path.

11. The apparatus of claim 10 wherein said tracks are each pivoted at the respective ends thereof remote from said vertical path about a vertical axis to facilitate the respective other ends of said tracks located at said transfer station to move through arcuate horizontal paths between said inner and outer orientations.

12. The apparatus of claim 11 wherein said means for moving said transfer members includes horizontal screw means disposed transversely of, and threadedly engaged with, said tracks to pivot said tracks between said inner and outer orientations when said screw means is selectively bidirectionally driven.

13. The apparatus of claim 10 wherein said tracks are each inclined downwardly away from said transfer station to transport away from said vertical path under gravity force an article transferred to said tracks from a downwardly moving article support.

14. Apparatus for transferring an article at a transfer station proximate said path, comprising:
   a mobile article carrier,
   means for moving said carrier upwardly in a defined generally vertical path proximate a transfer station,
   an article support moving with said carrier for supporting an article engaged therewith, said article support being configured to engage an article unsupported thereby when said article support moves vertically upwardly relative to said unsupported article,
   a pair of projections extending generally horizontally from opposite sides of said article,
   a pair of generally horizontally disposed article transfer members located at said transfer station proximate said vertical path and selectively movable toward and away from each other between an inner transfer orientation in vertical alignment with said pair of projections and an outer bypass orientation disposed outwardly of said projections in vertical misalignment therewith, and
   means for alternatively moving said article transfer members between said inner transfer orientation and said outer bypass orientation, said article transfer means when in said inner transfer position transferring an article whose projections are supportingly engaged by said transfer members to said underlying vertically upwardly moving article support, said article transfer means when in said outer bypass position providing clearance between said article transfer members and the projections of an article supported on an upwardly moving article support at said transfer station to preclude transfer of said supported article from said support to said transfer members.

15. The apparatus of claim 14 wherein
   said article support includes a generally horizontally disposed platform secured to and extending from said article carrier moving means, and
   said article includes a generally horizontal bottom surface adapted to selectively seat on said platform for facilitating support of said article by said article support when engaged thereby.

16. The apparatus of claim 14 wherein said transfer members are each elongated tracks which, when in said inner orientation, are substantially parallel for underlying and slidingly engaging the projections of an article to facilitate transport thereof in a horizontal direction toward said vertical path to facilitate transfer thereof to said article support.

17. The apparatus of claim 14 wherein said tracks are each pivoted at the respective ends thereof remote from said vertical path about a vertical axis to facilitate the respective other ends of said tracks located at said transfer station to move through arcuate horizontal paths between said inner and outer orientations.

18. The apparatus of claim 17 wherein said means for moving said transfer members includes horizontal screw means disposed transversely of, and threadedly engaged with, said tracks to pivot said tracks between said inner and outer orientations when said screw means is selectively bidirectionally driven.

19. The apparatus of claim 16 wherein said tracks are each inclined downwardly toward said transfer station to transport toward said vertical path under gravity force an article on said tracks for transfer from said track to an upwardly moving article support.

20. A method of transferring an article at a transfer station, comprising the steps of:
   moving a mobile article support vertically downwardly in a defined generally vertical path through a transfer station with an article supported thereon, and
   moving a pair of generally horizontally disposed article transfer members located at the transfer station proximate the vertical path toward each other from (a) an outer bypass orientation in which the transfer members are located outboard of, and in vertical misalignment with, a pair of projections which extend generally horizontally from opposite sides of the article to (b) an inner transfer orientation in vertical alignment with the pair of projections to transfer an article engaged on the vertically downwardly moving support to the transfer members as said article support moves vertically downwardly between said transfer members and said projections abut said underlying transfer members.

21. The method of claim 20 further including the steps of inclining the transfer members downwardly away from the transfer station to transport away from the vertical path under gravity force an article transferred from the downwardly moving article carrier to the article transfer members.

22. A method of transferring an article at a transfer station, comprising the steps of:
   moving a mobile article support vertically upwardly in a defined generally vertical path through a transfer station with an article supported thereon, and
   moving a pair of generally horizontally disposed article transfer members located at a transfer station proximate the vertical path toward each other from (a) an outer bypass orientation in which the transfer members are located outboard of, and in vertical misalignment with, a pair of projections which extend generally horizontally from opposite sides of the article to (b) an inner transfer orientation in vertical alignment with the pair of projections to transfer an article having its projections engaged on the transfer members to the vertically upwardly moving underlying support as the support passes between the transfer members.

23. The method of claim 22 further including the step of inclining the transfer members downwardly toward the vertical path to transport toward the upwardly moving support under gravity force an article whose projections are supported on said transfer members for transfer of the article to said upwardly moving article support as the support passes between the transfer members.

24. A method of transferring an article at a transfer station, comprising:
   selectively alternatively moving a mobile article support upwardly and downwardly in a defined generally vertical path, and
   selectively alternatively moving a pair of generally horizontally disposed article transfer members located at the transfer station proximate the vertical path between (a) an inner transfer orientation and (b) an outer bypass orientation, the article transfer means when in its inner transfer orientation alternatively (i) underlying a pair of projections which extend horizontally from opposite sides of the article to transfer an article supported by the vertically downwardly moving support to the transfer member as the support passes therebetween, or (ii) transferring an article whose projections are supported by the transfer members to the underlying vertically upwardly moving article support as the support passes therebetween, the article transfer means when in its outer bypass position providing clearance between the article transfer members and the projections of an article to preclude transfer of an article between a vertically moving article support and the transfer members.

* * * * *